United States Patent

Yamamoto et al.

[15] 3,653,964
[45] Apr. 4, 1972

[54] METHOD OF WASHING POLYAMIDE PRODUCING APPARATUS

[72] Inventors: Akira Yamamoto; Keiichi Moriyama, both of Mihara-shi, Japan

[73] Assignee: Teijin Limited, Osaka, Japan

[22] Filed: Nov. 10, 1969

[21] Appl. No.: 875,578

[30] Foreign Application Priority Data

Dec. 25, 1968 Japan..................................43/95622

[52] U.S. Cl...................................134/42, 134/22, 134/30, 134/38
[51] Int. Cl. .........................................B08b 3/10, B08b 9/00
[58] Field of Search..........................134/42, 2, 5, 22, 38–40, 134/29–30; 264/39

[56] References Cited

UNITED STATES PATENTS 3,053,897   9/1962   Clark et al. ..........................134/38 X

FOREIGN PATENTS OR APPLICATIONS 796,770   6/1958   Great Britain..........................134/28

*Primary Examiner*—Morris O. Wolk
*Assistant Examiner*—Joseph T. Zatarga
*Attorney*—Richard A. Anderson and Roy H. Massengill

[57] ABSTRACT

A method of removing a coating formed on a polyamide producing apparatus by contact with a molten polyamide, which comprises contacting the coating with a composition at a temperature not lower than 200° C., said composition consisting mainly of an ethanolamine and 0.01 to 10 percent by weight, based on said ethanolamine, of a basic substance selected from the group consisting of hydroxides of alkali metals, hydroxides of alkaline earth metals and salts of alkali metals with weak acids.

4 Claims, No Drawings

METHOD OF WASHING POLYAMIDE PRODUCING APPARATUS

BACKGROUND OF THE INVENTION

The present invention relates to a method of washing a polyamide producing apparatus which has been contaminated by contact with a molten polyamide.

The polyamide producing apparatus to which the present invention is applicable include apparatus used for the polymerization of polyamides, apparatus used for the spinning of polyamides, apparatus used for the shaping of polyamides and all and any apparatus used for the production of polyamide products.

For removing a polyamide attached to a polyamide producing apparatus, there has been employed a method wherein the apparatus is washed with dilute nitric acid or a method wherein the attached polyamide is removed by mechanical means. There has also been proposed a method wherein mono- or poly-hydroxy compound is used as a washing agent and a method wherein the attached polyamide is removed by dissolving it at an elevated temperature using ethanolamines as washing agent. For instance, the German Pat. No. 1,133,212 Specification and German Pat. No. 1,143,375 Specification describe the use of mono- or poly-hydroxy compound as washing agent, and Belgian Pat. No. 668,241 Specification discloses the use of ethanolamines.

However, these conventional detergents have the drawback that they are incapable of removing the coating attached to a polyamide producing apparatus which has been used for an extended period for the production of polyamide products. This is because if the polyamide is retained at an elevated temperature over an extended period, it is subjected to a modification forming an insoluble and unmeltable substance. Such tendency is more apparent in case of such polyamide producing apparatus as, for example, polymerization apparatus, spinning apparatus and shaping apparatus, because these apparatus are generally used continuously for a prolonged period. It is particularly difficult to remove the coating from the polymerization apparatus. In view of the above, a method has been desired which is not only adapted to remove a molten polyamide attached to the apparatus but also adapted to easily remove a modified polyamide attached to the apparatus which is very difficult to remove.

SUMMARY OF THE INVENTION

The present invention relates to a method of removing a coating formed on a polyamide producing apparatus by contact with a molten polyamide therefrom, which comprises contacting the coating with a composition at a temperature not lower than 200° C., said composition consisting mainly of an ethanolamine and 0.01 to 10 percent by weight with respect to said ethanolamine of a composition at a temperature not lower than 200° C., said composition consisting mainly of a basic compound selected from the group consisting of hydroxides of alkaline earth metals and salts of alkali metals with weak acids.

The ethanolamines used in the method of this invention include ethanolamine, diethanolamine and triethanolamine, of which diethanol- and triethanolamine are preferably used.

The basic compounds to be used in the method of this invention include hydroxides of alkaline earth metals, and hydroxides and strongly alkaline salts with weak acids of alkali metals, e.g., such hydroxides of alkali metals and alkaline earth metals as sodium hydroxide, potassium hydroxide, lithium hydroxide and calcium hydroxide, and the strongly alkaline salts with weak acids include alkali metal salts with carbonic acid, such as sodium carbonate, sodium hydrogencarbonate, potassium carbonate and potassium hydrogencarbonate; alkali metal salts with carbolic acid, such as sodium phenoxide and potassium phenoxide; and alkali metal salts with aliphatic acids, such as sodium formate, lithium acetate, sodium stearate and lithium palmitate.

In the method of this invention, the basic compound is used in an amount of 0.01 to 10 percent by weight, preferably 0.5 to 1.0 percent by weight, based on the ethanolamine used. A satisfactory washing effect cannot be expected with an amount outside the range specified above.

The washing solution used in the method of the present invention is, as described above, composed mainly of a mixture of ethanolamine and 0.01 to 10 percent by weight of basic inorganic compound, and may be diluted with an inert solvent as required.

The degree of dilution should be limited within the range in which the object of the present method can be attained. In practice, however, the dilution degree is preferably such that the total of the ethanolamine and basic compound in the entire composition is 60 percent by weight or more.

The object of the present invention is to readily and completely remove such a coating which is hard to remove with a conventional detergent.

In connection with such washing method, the present inventors have conducted a study on polyamide decomposing agents and found that use of a certain decomposing agent would frequently result in the formation, for example, in a tarry decomposition product which is converted into a hard to remove coating upon solidification.

However, it has also been found a surprising fact that when a specific detergent, one of the ethanolamines, is used in combination with a specific decomposing agent, a basic compound, the hard to remove coating can readily be removed at an elevated temperature and yet the washing remains transparent.

PREFERRED EMBODIMENTS

According to the study conducted by the present inventors, it has been revealed that the solution from the washing operation is more transparent and the washing can be effected more completely as the basicity of the basic compound used becomes higher.

The washing according to the method of this invention can be carried out by maintaining that portion of a polyamide producing apparatus which has been coated by contact with a molten polyamide, at a temperature of 200° C. or higher while contacting said portion with a composition of one of the ethanolamines and a basic compound as described above.

In the case, the apparatus to be washed may be heated in a bath of said detergent or the apparatus may be heated with said detergent being poured directly in the apparatus. Alternatively, the detergent may be poured into an apparatus after heating said detergent to a suitable temperature, as in the case of pouring a detergent into a container which is maintained at a high temperature of 200° or higher, as a polymerization tank. Still alternatively, the washing operation may be effected by connecting a detergent storage tank with an apparatus to be washed with a pipe and circulating the detergent through said pipe by means of a pump while maintaining said tank and said apparatus at a predetermined temperature. Where an apparatus to be washed is heated together with a detergent, the washing can be effected at normal pressure if the heating is effected at a temperature lower than the boiling temperature of said detergent. Furthermore, even if the washing is carried out at a temperature in the proximity of the boiling point, a loss of the detergent due to evaporation can be avoided by providing a condenser or by carrying out the washing under sealed condition.

In the method of this invention, the washing time is adjusted in accordance with the degree of staining. The washing time is normally from 1 to 4 hours to obtain a sufficient effect, but a longer time is required when the apparatus is coated particularly heavily. It is important that the waste washing solution is removed to the possible extent upon completion of the washing operation.

This can be achieved by projection steam or using a jet cleaner or washing with water.

The present invention will be further illustrated by way of example but it should be noted that the invention is of course not restricted only to the examples shown. In the Examples, all parts are by weight, unless otherwise specified.

EXAMPLE 1

In an autoclave of 500 parts in capacity made of stainless steel and having insoluble and unmeltable poly-ε-caprolactam attached thereto, was charged a washing solution consisting of 2 parts of sodium hydroxide and 200 parts of triethanolamine, and the autoclave was heated to 230° C.

Stirring of the washing solution was started at 230° C. and 2 hours later, the used washing solution was withdrawn from the bottom of the autoclave, and thereafter the autoclave was cooled. The waste washing solution was yellow in color and transparent and no coating was observed on the wall surface of the autoclave.

After cooling, the remaining waste washing solution was washed off with water. The polymer attached before the washing was an insoluble and unmeltable material which is not soluble in metacresol and not molten but decomposed with heat. However, the substance dissolved in the triethanolamine withdrawn from the bottom of the autoclave after washing, was even soluble in methanol, to prove that the polymer had completely been converted into a low molecular substance.

EXAMPLE 2

A washing solution consisting of 2 parts of lithium acetate and 200 parts of diethanolamine and previously heated to 150° C. was fed into a batch-type poly-ε-caprolactam polymerization tank from the top thereof by means of a pump. This tank had continuously been used for an extended period. The wash solution was maintained at 210° C. Stirring the washing solution, the tank was closed and maintained at 210° C. Three hours later, the washing solution was discharged through a discharge port at the bottom of the tank. After draining the washing solution sufficiently, ε-caprolactam heated to 210° C. through a preheater was charged into the polymerization tank to the upper portion thereof and after stirring it for 3 hours at 250° C., discharged from said tank. The tank was further washed with ε-caprolactam and then used for the production of polycaprolactam. No particular problem was encountered in the polymerization.

EXAMPLES 3 to 5

A metallic pipe with a polyhexamethyleneadipamide coating was immersed into a vat filled with triethanolamine and after adding a basic inorganic compound to bring the concentration of the mixture to a predetermined value, the vat was heated at 230° C. for 3 hours. After cooling, the pipe was removed and washed with water, the washing effects being shown in Table 1.

The decomposition ratio shown in the Table is a percentage of the amount of attached polymer which had been decomposed, which percentage was obtained by calculating the ratio between the weight of the methanol insoluble component present in the waste washing solution and the weight of the polymer attached to the pipe before washing.

CONTROL EXAMPLES 1 to 3

Washings were carried out in the same manner as in Examples 3 to 5, but using washing solutions of different compositions, the washing effects being shown in Table 2.

We claim:

1. The method of removing a coating formed on polyamide producing apparatus by contact with molten polyamide comprising contacting at a temperature not lower than 200° C. said coating with a composition of an ethanolamine selected from the group consisting of ethanolamine, diethanolamine, triethanolamine and from about 0.01 to 10 percent by weight based on weight of the ethanolamine of a basic compound selected from the group consisting of hydroxides of alkali metals, hydroxides of alkaline earth metals and salts of alkali metals with weak acids, said coating being an otherwise insoluble and unmeltable substance resulting from polyamide being retained at an elevated temperature over an extended period.

2. The method of claim 1 wherein the basic substance is present in an amount of from about 0.5 to 1.0 percent by weight.

3. The method of claim 1 wherein the basic compound is selected from sodium hydroxide, potassium hydroxide, lithium hydroxide, calcium hydroxide, sodium carbonate, sodium hydrogencarbonate, potassium carbonate, potassium hydrogencarbonate, sodium phenoxide, potassium phenoxide, sodium formate, lithium acetate, sodium stearate and lithium palmitate.

4. The method of claim 1 wherein the temperature is between about 210° and about 230° C.

TABLE 1

| | Washing solution | Additive | Amount of additive, percent | Decomposition ratio, percent | Color of waste washing solution | Coating remaining after washing |
|---|---|---|---|---|---|---|
| Example: | | | | | | |
| 3 | Triethanolamine | KOH | 1.0 | 100 | Yellow transparent | None. |
| 4 | do | Na₂CO₃ | 1.0 | 40 | Slightly brown | Almost none. |
| 5 | do | Lithium acetate | 1.0 | 80 | Brown | Do. |

TABLE 2

| | Washing solution | Additive | Amount of additive, percent | Decomposition ratio, percent | Color of waste washing solution | Coating remaining after washing |
|---|---|---|---|---|---|---|
| Control example: | | | | | | |
| 1 | Triethanolamine | None | | 55 | Black | Black substance. |
| 2 | do | Phosphoric acid | 1.0 | 100 | do | Do. |
| 3 | Glycerine | Boric acid | 1.0 | 60 | Blackish brown | Blackish brown.[1] |

[1] Viscous substance formed.

NOTE.—From the Table above, it will be seen that the washing effects are considerably low.